United States Patent
Hoffman (10) Patent No.: US 8,600,820 B2
(45) Date of Patent: Dec. 3, 2013

(54) METHOD AND SYSTEM FOR LABELING AND MANAGING THE SALE OF MANUFACTURED CONCRETE BLOCKS

(75) Inventor: Paul Hoffman, Alvadore, OR (US)

(73) Assignee: Pro Shop Plans Co. Inc., Alvadore, OR (US)

( * ) Notice: Subject to any disclaimer, the term of this patent is extended or adjusted under 35 U.S.C. 154(b) by 517 days.

(21) Appl. No.: 12/508,395

(22) Filed: Jul. 23, 2009

(65) Prior Publication Data

US 2009/0299867 A1 Dec. 3, 2009

Related U.S. Application Data

(62) Division of application No. 10/317,716, filed on Dec. 12, 2002.

(51) Int. Cl.
  *G06Q 30/00* (2012.01)
  *G06Q 20/00* (2012.01)
(52) U.S. Cl.
  USPC ................................................ 705/26; 705/23
(58) Field of Classification Search
  USPC ...................................................... 705/26, 23
  See application file for complete search history.

(56) References Cited

U.S. PATENT DOCUMENTS

| | | |
|---|---|---|
| 1,925,603 A | 9/1933 | Reiher |
| 1,929,468 A | 10/1933 | Bales at al. |
| 3,126,861 A | 3/1964 | Sheinwald |
| 3,330,079 A | 7/1967 | Mitchell et al. |
| 3,481,089 A | 12/1969 | Sheidow |
| 3,550,244 A | 12/1970 | Villo et al. |
| 3,574,269 A | 4/1971 | Rea |
| 3,959,624 A | 5/1976 | Kaslow |
| 4,207,979 A | 6/1980 | Brown |
| 4,285,426 A | 8/1981 | Cahill |
| 4,321,103 A * | 3/1982 | Lindstrom et al. ............. 156/351 |
| 4,340,810 A | 7/1982 | Glass |
| 4,420,082 A | 12/1983 | Bernie |

(Continued)

OTHER PUBLICATIONS

MacTac press release 1999 from wayback machine.*

(Continued)

*Primary Examiner* — Matthew Gart
*Assistant Examiner* — Harshad Parikh
(74) *Attorney, Agent, or Firm* — Husch Blackwell LLP (57) ABSTRACT

In a method for identifying manufactured concrete or masonry blocks and managing the sale thereof to a customer in a retail establishment, the retail establishment having a computer system configured to monitor inventory, a database operatively coupled to the computer system, and a plurality of point of sale (POS) terminals operatively coupled to the computer system. The method includes a) applying a releasably secured label to the concrete block or a layer of concrete blocks contained on a pallet, where the label has UPC information affixed thereon and is releasable from the concrete block or layer of concrete blocks on the pallet, b) selecting for purchase by the customer, a number of concrete blocks from a selected pallet, c) removing the label from the concrete block or the layer of concrete blocks on the pallet, d) presenting the label at the POS terminal, e) scanning the label via the POS terminal to process the UPC information, and entering the number of concrete blocks intended for purchase, f) transmitting data encoded in the UPC information to the computer system along with an indication of the number of concrete blocks purchased to effect maintenance of the inventory of concrete blocks, and g) issuing a receipt to the purchaser evidencing purchase of the concrete blocks.

11 Claims, 10 Drawing Sheets

(56) References Cited

U.S. PATENT DOCUMENTS

| | | | |
|---|---|---|---|
| 4,554,446 | A | 11/1985 | Murphy et al. |
| 4,720,625 | A | 1/1988 | Arney et al. |
| 4,725,078 | A | 2/1988 | Janicki |
| 4,777,085 | A * | 10/1988 | Murray et al. ............... 428/353 |
| 4,884,712 | A * | 12/1989 | Schoeller et al. ............ 220/516 |
| 4,939,674 | A * | 7/1990 | Price et al. .................... 358/1.9 |
| 5,120,941 | A * | 6/1992 | Reilley et al. ................ 235/375 |
| 5,290,165 | A * | 3/1994 | Pitha ............................. 425/150 |
| 5,304,333 | A * | 4/1994 | Trevino-Gonzales ........ 264/234 |
| 5,422,076 | A | 6/1995 | Jones |
| 5,425,497 | A | 6/1995 | Sorensen |
| 5,433,340 | A * | 7/1995 | Hoffman ........................ 221/25 |
| 5,591,287 | A * | 1/1997 | Clegg et al. ................ 156/89.27 |
| 5,639,529 | A * | 6/1997 | Gozdecki et al. ............. 428/40.1 |
| 5,690,464 | A * | 11/1997 | Gagnon et al. ................ 414/286 |
| 5,848,867 | A * | 12/1998 | Gagnon et al. ................ 414/281 |
| 5,865,918 | A * | 2/1999 | Franklin et al. ................ 156/64 |
| 5,899,046 | A * | 5/1999 | Hughes ........................ 53/139.7 |
| 5,939,104 | A * | 8/1999 | Johnston ....................... 425/356 |
| 6,037,027 | A | 3/2000 | Nakano et al. |
| 6,083,342 | A * | 7/2000 | Frey ............................. 156/297 |
| 6,286,251 | B1 * | 9/2001 | Whitson ........................... 47/33 |
| 6,295,772 | B1 * | 10/2001 | Whitson ......................... 52/182 |
| 6,296,404 | B1 * | 10/2001 | Pierce et al. .................... 400/62 |
| 6,458,446 | B1 * | 10/2002 | Andronaco et al. ........... 428/161 |
| 6,910,796 | B2 * | 6/2005 | Bailey et al. ..................... 366/40 |
| 7,760,092 | B1 * | 7/2010 | Hanania ...................... 340/572.1 |
| 2002/0023709 | A1 * | 2/2002 | Tedeschi et al. ............... 156/213 |
| 2002/0108706 | A1 * | 8/2002 | Roth et al. ..................... 156/252 |
| 2002/0144788 | A1 * | 10/2002 | Shortt et al. ................... 156/350 |
| 2003/0000872 | A1 * | 1/2003 | Alberts .......................... 209/577 |
| 2003/0122273 | A1 * | 7/2003 | Fifield ........................... 264/109 |
| 2004/0117265 | A1 * | 6/2004 | Hoffman ......................... 705/26 |
| 2004/0129150 | A1 * | 7/2004 | Lancaster et al. ............... 99/486 |
| 2005/0234835 | A1 * | 10/2005 | Stonoha et al. ................ 705/401 |
| 2007/0187949 | A1 * | 8/2007 | Uruno et al. ................... 283/105 |
| 2008/0131255 | A1 * | 6/2008 | Hessler et al. ............. 414/788.1 |
| 2008/0317979 | A1 * | 12/2008 | Itakura et al. ................... 428/29 |
| 2009/0252274 | A1 * | 10/2009 | Singh ............................. 376/274 |
| 2009/0299867 | A1 * | 12/2009 | Hoffman ......................... 705/22 |
| 2012/0320199 | A1 * | 12/2012 | Kundu et al. .................. 348/143 |

OTHER PUBLICATIONS

MacTac press release Oct. 15, 2008.*

Office Action dtd Feb. 15, 2013 and response for related U.S. Appl. No. 12/508,410.

Office Action dtd Mar. 20, 2012 and response for related U.S. Appl. No. 10/317,716.

Office Action dtd Jun. 21, 2011 for related U.S. Appl. No. 10/317,716.

Office Action dtd Sep. 21, 2011 for related U.S. Appl. No. 12/508,410.

Office Action dted Jun. 14, 2011 for related U.S. Appl. No. 12/508,378.

* cited by examiner

ND SYSTEM FOR LABELING
METHOD AND SYSTEM FOR LABELING AND MANAGING THE SALE OF MANUFACTURED CONCRETE BLOCKS

CROSS REFERENCE

The following application is a divisional application of and claims priority from U.S. utility application Ser. No. 10/317,716 filed on 12 Dec. 2002.

FIELD OF THE INVENTION

The present invention relates generally to a method and system for labeling merchandise, and more specifically to a method and system for identifying and managing the sale of concrete or masonry blocks in a retail establishment. According to the present invention, bulk-packed generic blocks are marketed as individual branded products.

BACKGROUND

Manufactured concrete blocks are used for many different purposes, including stepping stones, earth retaining barriers, pier blocks, patios, structural walls, and the like. The manufacturing process for such concrete blocks is generally similar from product to product. The blocks are quickly formed in a mold and cured in a kiln for a predetermined period of time. Some of the resulting blocks manufactured in this way are porous and granular, such as wall blocks and pier blocks, and some blocks are dense and hard, such as patio blocks and stepping stones. Virtually any configuration or type of block may be manufactured in the same general process.

Blocks are discharged from the kiln and are typically stacked on wooden pallets. Most pallets of blocks are secured with steel straps, or the pallet may be wrapped in plastic film for safety and shipping. There is no standard size for pallets of blocks, but such pallets are generally about four feet square and about three feet in height. Individual pallets may contain hundreds of single blocks, such as stepping stones, or may contain only a few dozen larger blocks, such as retaining wall blocks. An average pallet may weigh three to four thousand pounds. Most "palletized" blocks are shipped on open flatbed trucks, and there is little or no rail cartage.

There are currently hundreds of concrete block manufacturers in the United States ranging from single site operations to very large multi-state producers. Each individual manufacturing site serves only a relatively small market area. Concrete blocks are not economically shipped over long distances due to the weight/freight cost ratio for such masonry products. As a result, each manufacturing site typically makes many different types of blocks for a local market area. This results in a very broad product line being maintained at each individual manufacturing site. In general, each site essentially duplicates the other sites in both facilities and product line. Concrete and masonry blocks are generic to the industry and are basically indistinguishable from manufacturer to manufacturer.

The industry benchmark block is the "CMU" (Concrete Masonry Unit), which has a rectangular shape with two open central apertures, and has dimensions of about eight inches by eight inches by sixteen inches. This product is generic throughout the industry and is sold in bulk stacked pallets with no associated trade name. The benchmark CMU is typically used for structural walls, and is in widespread use in commercial applications, such as shopping malls, industrial applications, such as warehouses, public applications, such as schools, and industrial applications, such as correctional facilities. Each of these applications generally requires many thousands of individual CMU blocks. Generic CMU blocks from any manufacturer may be used interchangeably in any of these applications.

A substantial volume of concrete and masonry blocks are also sold through retail building material dealers. These establishments sell to professionals as well as to "Do-It-Yourself" ("DIY") consumers. DIY consumers may use concrete blocks and masonry blocks for various projects, including walkways (stepping stones), decorative or landscaping walls (retaining wall blocks), decks (pier blocks), foundations (mobile home or manufactured home perimeter support walls), and patios and driveways (pavers or blocks with various semi-interlocking shapes). DIY projects can require many hundreds of individual concrete or masonry blocks per project. However, some uses, such as small planters or steps, may require substantially fewer blocks. Generic blocks from any manufacturer may be interchangeably used in any of these DIY applications. As referred to herein, the terms "concrete blocks," "masonry product," "CMU," and "manufactured block" are used interchangeably to describe blocks in all applications.

As mentioned above, concrete blocks are sold in bulk. In retail sales, such blocks may be purchased directly from the shipping pallet on which the blocks were delivered to the retail establishment. Concrete blocks are not individually boxed, packaged, wrapped or bagged, and bulk-stacked pallets are the industry standard. A typical pallet may or may not include the manufacturer's name or logo. The pallets are returnable for credit, and are generally interchangeable between products and manufacturers.

Concrete blocks have a relatively low dollar value in relation to weight and volume. Due to the variety and sizes of concrete block, a large number of individual pallets are required for an adequate retail store inventory. Each pallet may require approximately fifty cubic feet of store space, but is of a lower dollar value than an equal volume of most other retail products. As a retail sales category, concrete blocks are generally regarded as a "high space/low gross" sales item in retail establishments.

For the sale of a small quantity of concrete blocks, such as blocks for a planter or steps, one known procedure used in some retail stores requires the consumer to physically load the concrete blocks onto carts or trolleys. The blocks are then manually moved to the POS (point of sale) terminal for purchase, and then to the loading area where the blocks are loaded into the customer's vehicle. This procedure creates several problems with respect to retail sales of concrete blocks. First, the blocks cannot be automatically tabulated at the POS terminal because they are not individually priced or labeled. As mentioned above, concrete blocks are sold in bulk directly from the shipping pallet, with no identifying packaging. The normal check-out system comes to a halt and the blocks must be physically counted, visually identified, and manually priced. This is difficult because the blocks are typically heavy and cumbersome, and may have to be repeatedly handled for proper identification.

Additionally, problems occur because concrete blocks are typically sold in large unit quantities. Retaining walls, deck supports, patios, and driveways often require hundreds of individual blocks to be sold as a single purchase. Moving large quantities of blocks through store aisles is difficult for the consumer and potentially hazardous. Carts or trolleys can be overloaded or improperly loaded, and can overturn or spill. Hundreds of concrete blocks, often weighing thousands of pounds in aggregate cannot be efficiently moved through the stores aisles in carts or trolleys.

Due to the high space/low gross ratio, and the typical large quantity purchases involved, a second known process has developed for the retail sales of concrete blocks. Some retailers simply move the concrete block pallets to a peripheral site outside the store, such as to a portion of the parking lot or a fenced-in "lawn and garden" area. Concrete blocks are typically weather resistant and do not deteriorate when exposed to the elements. Valuable inside store space is not used, and the blocks are not typically "shoplifted." In this process, consumers are directed to the peripheral areas and load the blocks directly into their vehicles.

Although this second known process may eliminate the need to manually move the blocks through the store, it creates another problem, namely, that the concrete blocks do not pass through the POS terminal for tabulation. Rather, they are directly loaded into the consumer vehicle outside the store, thus by-passing the normal check-out system. This requires store personnel to escort the consumer back into the store to complete the sale. However, this procedure renders identification of the already loaded blocks even more problematic because there is no actual product at the POS terminal for proper identification of the block. In these cases, a sale may easily be incorrectly processed.

All of the above problems are a direct result of concrete block products not being labeled for identification and pricing. The present invention corrects these failures for both in-store and peripheral area sales of concrete blocks.

Most manufacturers that provide products to the retail marketplace assign a UPC (Universal Product code) number to each item they produce, which is typically marked on the packaging, wrapping, or label of each individual unit. The UPC number is encoded as a series of spaced apart vertical lines, commonly referred to as a barcode. The UPC number, in the form of a barcode, is recognizable to an electronic system or computer, and identifies the product, which is then used to ascertain its retail price. Such electronic systems are based on in-store computers, laser optical scanners, and the product identification number or UPC. The POS terminal typically includes a laser optical scanner, and is connected to a sales register or money drawer, which sales register is further coupled to the in-store computer.

The UPC barcode label provides a substantial advantage to the retailer. It eliminates the need to manually price each item, which translates into substantial cost savings in terms of personnel time and related expenses. The UPC barcode label on a package or product is integral to the efficient operation of a modern retail store, and is a key aspect of inventory control, point of sale transactions, and reported profitability.

For inventory control, most building material retailers maintain a certain minimum quantity for each product. When that minimum is reached, a purchase order is created to replenish the stock. The purchase order includes the UPC identifier, the quantity required, and typically, the desired delivery date. When new stock is delivered to the store, it is first entered into the store computer at the point of receiving. The information regarding the new shipment is quickly entered using the UPC barcode and purchase order. The in-store computer adds the new stock to the existing store inventory for "real time" inventory control. The new stock is then transferred to a designated location for consumer purchase.

For point of sale transactions in many modern building retailing stores, consumers collect products in carts or small trolleys and proceed to the POS terminal to complete the purchase. The UPC barcode on the product is scanned, and the computer identifies the item and its assigned retail price. Multiple items of the same product are automatically tabulated and totaled. The retail prices are displayed and collated by the sales register for a final cost. In most cases, the cashier does not know the price of any given item (except to the extent that the price is displayed once the item is scanned) and does not count the items. The POS terminal also computes the amount tendered by the customer and automatically displays the correct amount of change. Most modern retail stores are heavily dependent on such electronic systems to facilitate consumer purchases.

For reported profitability, the UPC code is part of another important electronic process that occurs at the POS terminal. As each item is scanned, it is automatically deducted from the recorded inventory. The daily inventory depletion of every product is monitored through the scanning of the UPC barcode, which in turn, provides the data for a purchase order to replenish the stock. The use of the UPC identifier is also integral to in-store accounting, product returns and vendor sales data through EDI (Electronic Data Interchange) systems. Through the use of the UPC barcode, the in-store computer may continuously monitor product turnover ratios (gross margins), out of stock items (lost sales), and shrinkage (theft), and thus the profitability of each item in the store. This electronically generated data, which is dependent on the UPC identifier, provides the fundamental basis for the reported profitability of the store.

However, in the concrete block manufacturing industry, the accepted opinion is that concrete blocks cannot be effectively labeled, thus precluding the use of UPC encoding, and negating the established electronic format of many retail establishments. Concrete blocks are stocked by most building material retailers because they are a high-demand DIY product with a wide array of DIY uses. However, they are treated as an anomaly by the retailers and are dealt with on a manual basis instead of the above-described electronic basis.

With regard to the lack of labeling and product identification for concrete blocks, some blocks are too porous and granular for positive adhesion of a typical adhesive label. Alternatively, some blocks are too hard and dense for positive attachment of a label using mechanical means, such as a staple. Concrete blocks also have textured surfaces, such as an exposed aggregate or machine-split side, have different moisture contents due to various curing times, and typically have a fine coating of residual concrete "dust" resulting from the manufacturing environment, all of which further circumvent the positive attachment of labels. Non-positive attachment of labels results in defective labeling.

Block sizes range from small bricks (concrete or clay) up to large retaining wall blocks. The blocks may be manufactured in a variety of shapes, including square, rectangle, trapezoid, pyramid and many irregular polygonal shapes. Designs may include blocks with internal hollow cavities, integrally formed recesses, non-planar surfaces, radius corners, beveled edges, and the like.

Although concrete blocks are mass produced on rapid production lines, they are the antithesis of a "standardized" product. Such a variety of irregular and different product configurations, typically made by each manufacturer in a local market area, leads to intractable problems for the positive application of labels. The standard methodologies of product labeling is defeated, and labels cannot be positively attached to blocks because of the gross irregularities of products. Labels that "fall off" due to non-positive attachment are contrary to the intended process of labeling. Further, direct printing on the irregular surfaces of blocks is not feasible because the surfaces of the blocks are not sufficiently smooth or uniform to receive applied ink.

Finally, manufactured concrete blocks are shipped on open flatbed trucks and stored outside, often for long periods of time, which subjects any label to adverse environmental conditions. As mentioned above, the manufacturing process typically leaves a fine coating or layer of residue concrete "dust," which further inhibits positive labeling with adhesive or glue. Even absent such dust, some blocks are too porous and granular for use with a typical adhesive label. Additionally, some concrete blocks are too hard or dense to accept alternative attachment means, such as a staple or track. Direct printing of labels on blocks is not feasible because the external surfaces of the blocks are not sufficiently smooth or uniform, and such blocks are typically stored outside, often for long periods of time, where they are exposed to the elements, which further negatively affects positive attachment of labels.

Given the importance of the UPC barcode system for modern retailers, the failure of the industry to provide an adequate system for the labeling of concrete blocks using UPC barcode labels is problematic. As mentioned above, most building material retailers stock a variety of manufactured concrete blocks, which are sold in bulk directly from a shipping pallet, and are not individually packaged, wrapped or labeled. As such, concrete blocks in retail stores do not include a UPC barcode identifier. This is contrary to the established electronic format of most modern retailers, and is disruptive to the operation of the store.

Because concrete blocks cannot be identified by the standard electronic systems of a retail store, some retailers have been forced to adopt alternate processes for managing the sale of concrete blocks. In the beginning of such known processes, when replenishment shipments of unlabeled concrete blocks are delivered to a store, they must be manually entered into the computer system at the point of receiving. Manual entry slows the receiving process, requires additional personnel and creates delivery delays and errors.

Once the concrete blocks have been stocked, the above-described problems of unlabeled product at the POS terminal occur. An alternative known method of sales used by some retailers is to place a loose-leaf notebook by the POS terminal. The notebook may contain sample drawings of concrete blocks, their retail price, and a number equivalent to a UPC identifier. The cashier then visually compares the blocks being purchased to the drawings in the notebook to identify the blocks and establish the retail price. The blocks are physically counted, and the sale is manually entered into the POS terminal. On some occasions, other store personnel are requested by the cashier to locate an identifying number or unit price. This is very inefficient and typically results in pricing errors, inventory distortions, misstated sales reports and customer dissatisfaction.

Due to the lack of a labeling on concrete blocks, a variety of errors can occur when the cashier manually enters such a sale into the POS terminal or register. First, the blocks being purchased can be visually misidentified, particularly with regard to their size. Second, the item number as read from the notebook may be incorrectly entered into the sales register, particularly through transposition of digits. Third, the blocks may be improperly priced, particularly if the notebook is not current. Fourth, the blocks may be inaccurately tabulated, particularly through miscounting of multiple units. Any of the above-mentioned errors will result in a distortion of the inventory in the store, and any error in pricing or counting will misstate the sales and profit of the store.

A need exists for a system and method to identify and manage the sale of concrete blocks utilizing standard UPC barcodes for concrete blocks.

SUMMARY

The disadvantages of present methods for identifying concrete blocks may be substantially overcome by providing a novel method and system for identifying concrete blocks and managing the sale thereof to a customer in a retail establishment. Such novel method and system is a non-obvious answer to problems between two different industries, namely, the concrete block manufacturing industry and the retail sales industry. In the present invention, the concrete block industry problems becomes a solution for the retail sales of concrete blocks. That is, purposely intended releasable labels, or labels that can be directly removed from the product becomes the means to effectively sell concrete blocks to a consumer in a modern retail establishment. The purposely intended releasable labels allows the label itself to facilitate the sale with or without the actual product. The present invention allows various configurations of blocks to be sold in the established electronic format of modern retainers either for in-store sales or for peripheral area sales at a retail site.

More specifically, in one embodiment, the retail establishment has a computer system configured to track inventory, a database operatively coupled to the computer system, and a plurality of point of sale (POS) terminals operatively coupled to the computer system. The method includes a) applying a releasably secured label to a concrete block or a layer of concrete blocks contained on a pallet, where the label has UPC information affixed thereon and is releasable from at least one concrete block or layer of concrete blocks on the pallet, b) selecting for purchase by the customer, a number of concrete blocks from a selected pallet, c) removing the label from a concrete block or layer of concrete blocks on the pallet, d) presenting the label at the POS terminal, e) scanning the label via the POS terminal to process the UPC information and entering the number of concrete blocks intended for purchase, f) transmitting data encoded on the UPC barcode to the computer system along with an indication of the number of concrete blocks purchased to effect maintenance of the inventory of concrete blocks, and g) issuing a receipt to the purchaser evidencing purchase of the concrete blocks.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

Figure 1:
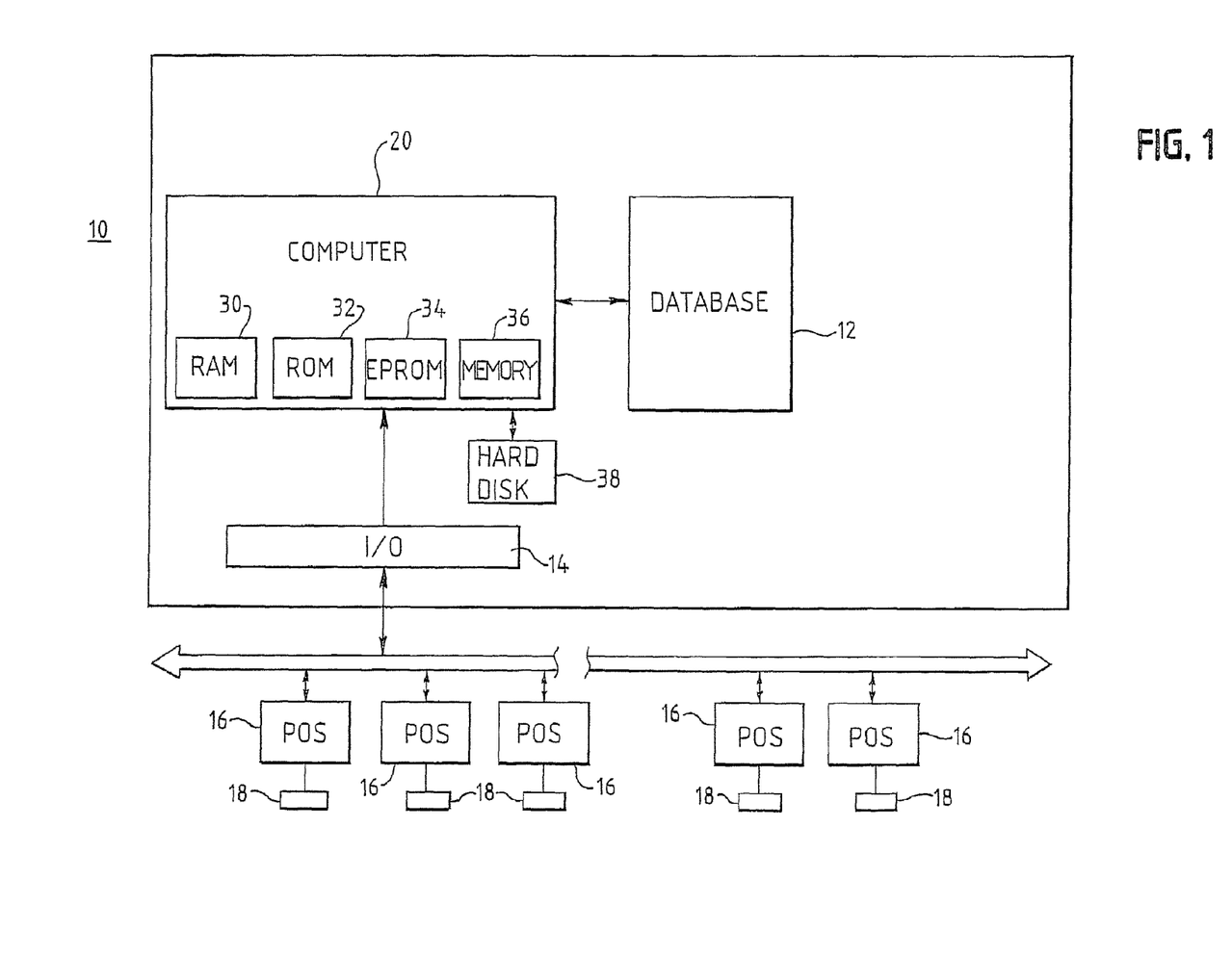
FIG. 1 is a high-level functional block diagram of a computer system for managing inventory in a retail establishment.

Referring now to FIG. 1, a high level functional block diagram is shown for a computer system 10 for use in identifying concrete or masonry block, and managing the sale thereof to a customer in a retail establishment. The computer system 10 may be configured to manage and track the inventory of products offered for sale in the retail establishment. Of course, the retail establishment may be a commercial establishment, self service establishment, and the like.

The computer system 10 may include a database 12 operatively coupled to the computer system, input/output peripherals 14, and a plurality of point of sale (POS) terminals 16 operatively coupled to the computer system. The database 12 may be remotely located from the computer system 10, as is known in the art. Any suitable number of POS terminals 16 may be included, depending upon the size and requirements of the retail establishment. Each POS terminal 16 preferably has a laser optical scanner 18 configured to scan universal product code (UPC) labels, including barcode labels.

The computer system 10 includes a computer 20, which may be any suitable computer, such as a processor, central processing unit (CPU), microprocessor, RISC (reduced instruction set computer), mainframe computer, mini-computer, work station, single chip computer, distributed processor, server, controller, micro-controller, discrete logic device, remote computer, internet computer, web computer, and the like. The computer 20 is part of the computer system 10 that includes various components that are known in the art, such as RAM 30, ROM 32, EPROM 34, other memory 36, hard disk 38, and the like. Preferably, the computer 20 is a mainframe computer, minicomputer, or server. Note that the POS terminals 16 may also include localized computers or microprocessors, as is known in the art.

The computer system 10 is a retail sales oriented system, and such suitable systems are in widespread use in most retail business establishments, such as department stores, supermarkets, and the like. Use of such known computer systems 10 having laser optical scanners 18 is described above with respect to operation thereof. Any suitable commercially available computer system may be used.

In particular, the present invention is directed to identifying and managing the sale of concrete or masonry blocks. As previously mentioned, "concrete block" and "masonry block" are used equivalently herein are intended to describe any of the various manufactured blocks described herein. Further, the composition material of the block need not necessary be concrete but may be, for example, clay, admixture composites, or other high density materials. As described herein, commercially available concrete blocks may be manufactured in virtually any configuration, depending on applicational use and consumer demand for a particular product. The present invention permits such concrete blocks to be appropriately labeled with UPC or barcode information so that the UPC label facilitates the sale of the blocks, and such labels may be scanned at the POS terminal for contemporary acceptance in the retail industry.

Figures 2A, 2B:
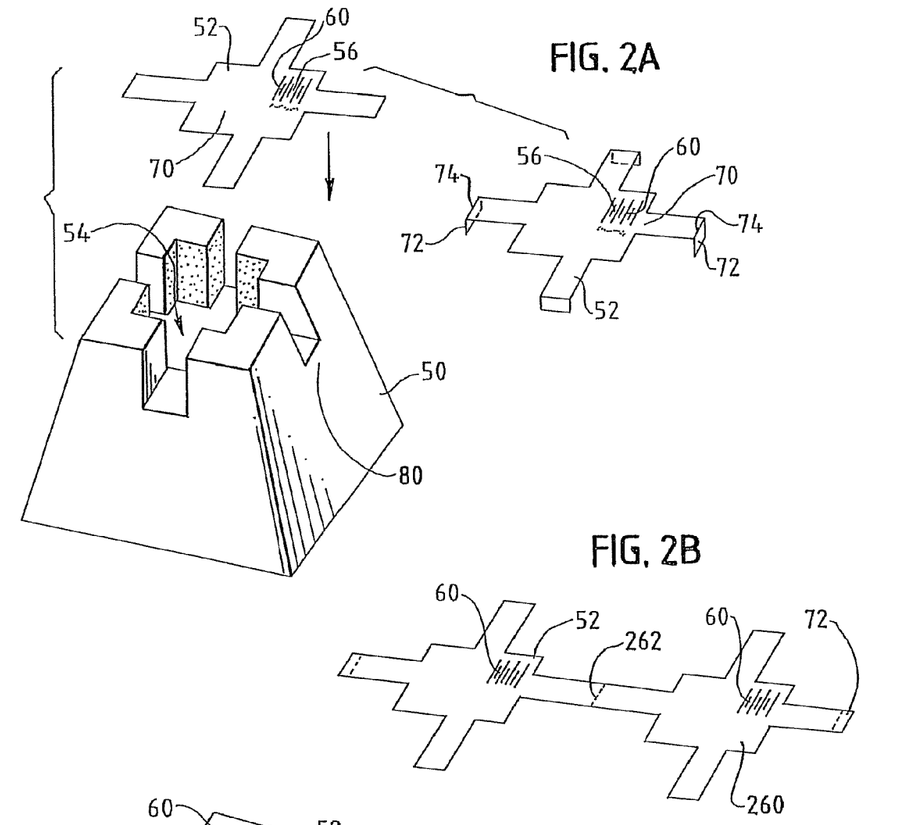
FIG. 2A is a pictorial view of a specific embodiment of a label for a concrete block showing releasable securement of the label to the concrete block.
FIG. 2B is a pictorial view of a specific embodiment of a label shown with a "mirror-image" label for receiving indicia thereon.

Before the operational process and advantages thereof are described, various configurations of labels will first be described in relation to corresponding concrete blocks. Turning now to FIG. 2A, a specific embodiment of a commercially available concrete block 50, with a corresponding novel label 52 are shown. The general truncated pyramid-shaped block 50 is commonly referred to as a "pier block." The concrete block 50 includes an integrally formed recessed area 54 molded in a top portion of the block. Of course, the shape or design of the integrally formed recess in such concrete blocks are essentially unlimited and is not limited to being disposed in the top portion of the block.

The label 52 is shown formed in a shape corresponding to the shape of the recessed area 54 in the block 50. The label 52 is preferably made of paper, synthetic or cardboard, and may be coated with or laminated in plastic to provide a predetermined amount of stiffness. The plastic is preferably clear so that printed indicia 56 on the paper may be visible.

The printed indicia 56 on the label 52 may include, for example, the UPC information, including the UPC barcode 60. Alphanumeric characters may also be included so that the information is in human-readable form. The indicia 56, however, need not necessarily be "printed" on the paper, and any suitable form of print transfer may be used. For example, some of the indicia 56, such as the barcode 60 itself, may be applied to the paper in the form of another "stick" label that may be adhered to the paper prior to being plastic coated or laminated. In another form, a portion of the label, such as a portion including the barcode indicia, may be detached by means of perforations or "tear-off" portions, while another portion of the label may remain attached to the block. It is contemplated by the present invention that the label is releasably secured from the block, meaning that is can be released, in part, or in full, from the block. Accordingly, such releasably secured labels may be fully removed from the block or layers of block, or may be released from a substrate that remains attached to the block, or may have a detachable portion where another portion of the label remains attached to the block.

Alternately, the entire label 52 may be formed of plastic with the indicia being deposited on an internal layer of the plastic with the indicia being deposited on an internal layer of the plastic. In that way, the label 52 may retain its strength and stiffness properties while the indicia may be protected from direct contact or abrasion. Further, the concrete blocks tend to be coarse and abrasive and may grind-off or otherwise obscure the printed indicia if it comes into contact with the label with a moderate amount of force, such as the weight of the concrete block. Accordingly, this is obviated by applying the label to the recessed portion of the block.

The label 52 is sufficiently stiff so that when portions of it are bent, such portions retain their shape as bent. Preferably, the labels 52 are bent along with the application of heat so that once cooled, the bent portions tend to be retained in the bent position. As shown in FIG. 2A, the label 52 includes a body portion 70. Two tab portions 72 integrally formed with the body portion 70 are defined by bend lines 74, which tab portions extend from opposite sides of the body portion. The tabs 72 are preferably bent at an angle relative to the body portion 70 so that when the label 52 is placed in the recessed area 54 of the concrete block 50, the tabs grip a portion of the block to releasably retain the label on the block.

Specifically, the tabs 72 exert pressure against sidewalls 80 of the block 50 sufficient to releasably secure the label 52 to the block. Essentially, a frictional fit is created between the tabs 72 of the label and the sidewalls 80 of the concrete block 50. The label 52 is preferably retained against the concrete block 50 with sufficient pressure to resist being inadvertently dislodged by the elements, such as wind and rain, as the blocks may be stored in an outside environment, as described above. Conversely, the label 52 may be retained against the concrete block 50 with sufficiently minimal pressure to permit the label to be released by hand and without the aid of tools, such as a scraper or pliers.

Figure 3:
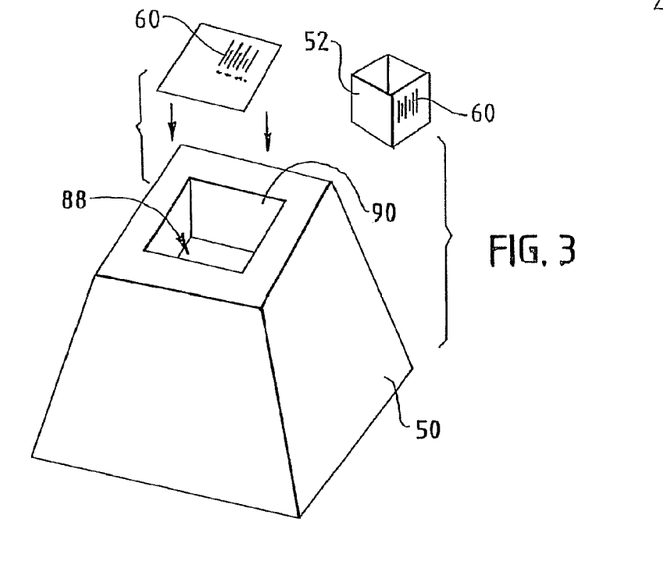
FIGS. 3-10 are pictorial views of alternate embodiments of a label for a concrete block or layer of concrete blocks.

Referring now to FIG. 3, another known concrete block 50 is shown in the form of a "pier block." Like reference numerals will be used to identify like structures although the specific shape of the block may differ from figure to figure. The pier block 50 includes a central recess 88 configured to receive a post. In this specific embodiment, the label 52 may be in the form of a continuous shape, such as a cube or "box" having only four sides, and absent top and bottom.

Alternatively, the label 52 may be a planar sheet dimensioned to be slightly larger than the recess 88. For example, the label 52 may be ¼ inch larger than the recess 88. As shown, the recess 88 is square or rectangular, but it may be any shape, such as circular, or polygonal. Accordingly, when the label 52 is inserted into the recess 88, the label will flex. The flexing of the label 52 may cause an interference or frictional fit with inside walls 90 defining the recess 88, thus causing the label to be releasably secured within the recess of the concrete block 50.

Figure 4:
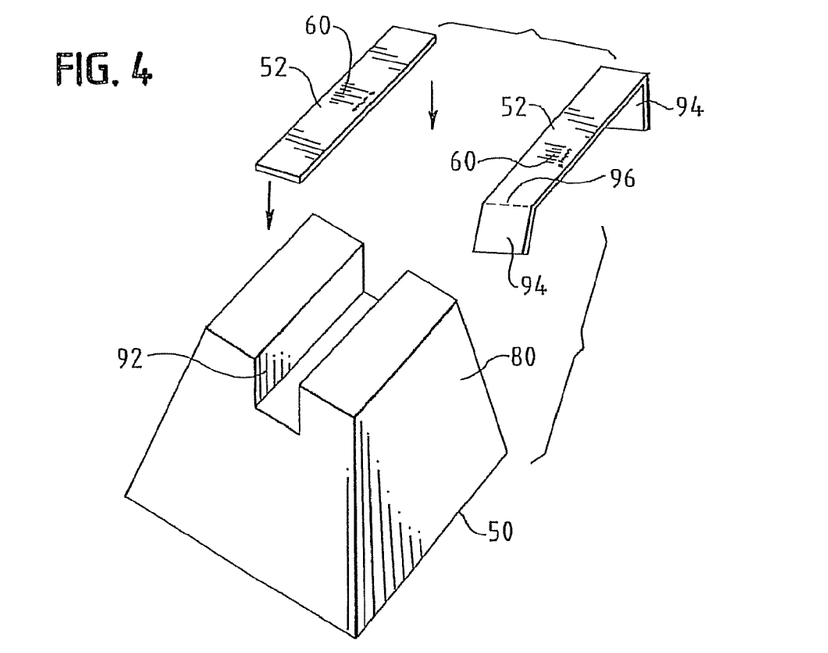

Referring now to FIG. 4, another known concrete block 50 is shown in the form of a pier block having a central channel 92 configured to receive a horizontal beam. In this specific embodiment, the label 52 may be in the form of a strip having tabs 94 at opposite ends. The tabs 94 are preferably bent along a fold line 96, and when the label 52 is applied into the channel 92 of the pier block 50, each tab 94 is urged against the sidewall 80 of the pier block forming a releasable frictional fit sufficient to retain the label 52 against the block.

Figure 5:
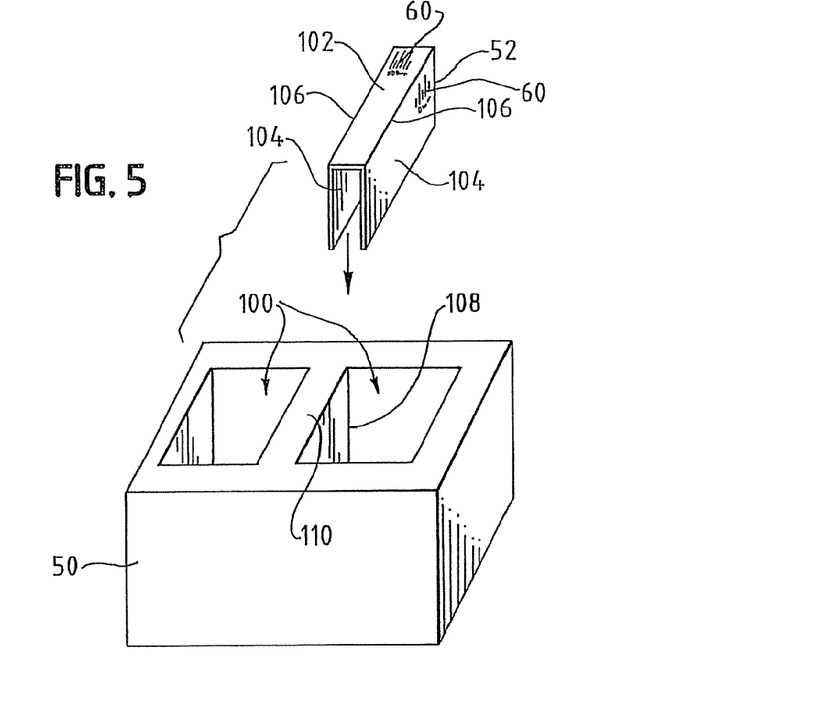

Referring now to FIG. 5, another known concrete block 50 is shown in the form of a standard CMU wall building block having two rectangular cavities 100. In this specific embodiment, the label 52 may be in the form of a "sleeve" or "book binding" shape having a spline 102 and two leaves 104. The leaves 104 are preferably bent along fold lines 106, and when the label 52 is applied into the concrete block 50, each leaf is urged against opposite sides 108 of a center wall 110 of the concrete block 50 forming a releasable frictional fit sufficient to retain the label 52 against the block.

Figure 6:
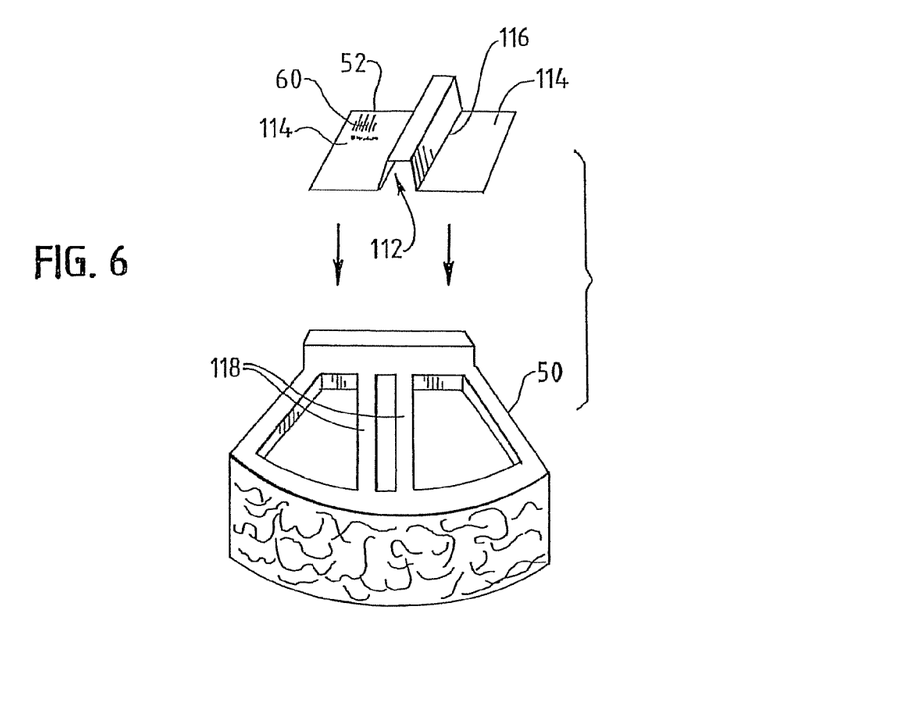

Referring now to FIG. 6, another known concrete block 50 is shown in the form of a small-size retaining wall block. In this specific embodiment, the label 52 may be in the form of a "square omega" shape having a central archway 112. Again, a pair of leaves 114 are preferably bent along a fold line 116 and are disposed at about a ninety degree angle relative to the archway 112 of the label 52. When the label 52 is applied into the concrete block 50, the walls of the archway 112 are urged against corresponding center walls 118 of the concrete block forming a releasable frictional fit sufficient to retain the label against the block.

Figure 7:
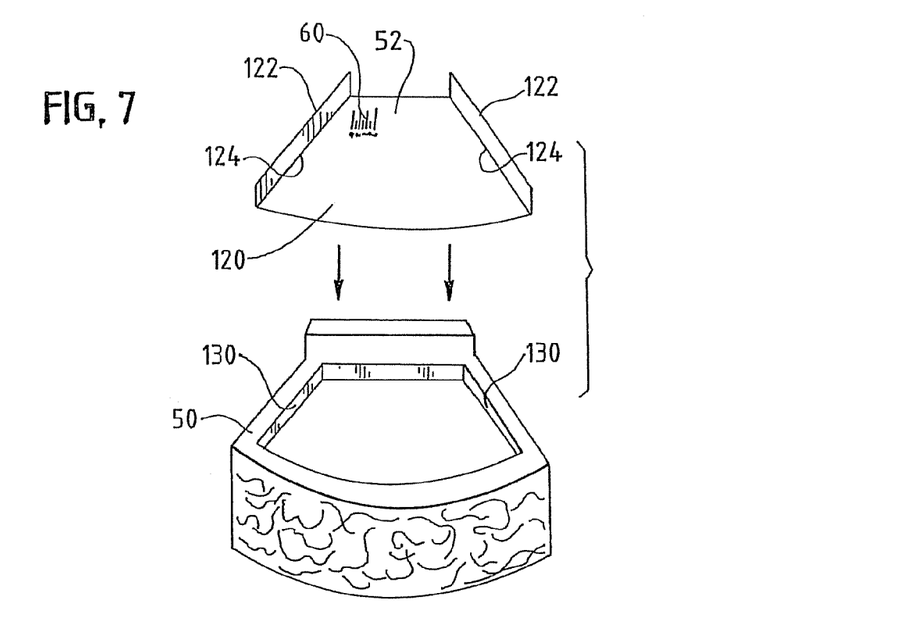

Referring now to FIG. 7, another known concrete block 50 is shown in the form of a large-size retaining wall block. In this specific embodiment, the label 52 may be in the form of a planar sheet 120 having upturned edges 122. The upturned edges 122 are preferably bent along a fold line 124 and are disposed at about a ninety degree angle relative to the sheet portion 120 of the label 52. When the label 52 is applied into the concrete block 50, the upturned edges 122 are urged against corresponding sidewalls 130 of the concrete block 50 forming a releasable frictional fit sufficient to retain the label against the block.

Figure 8:
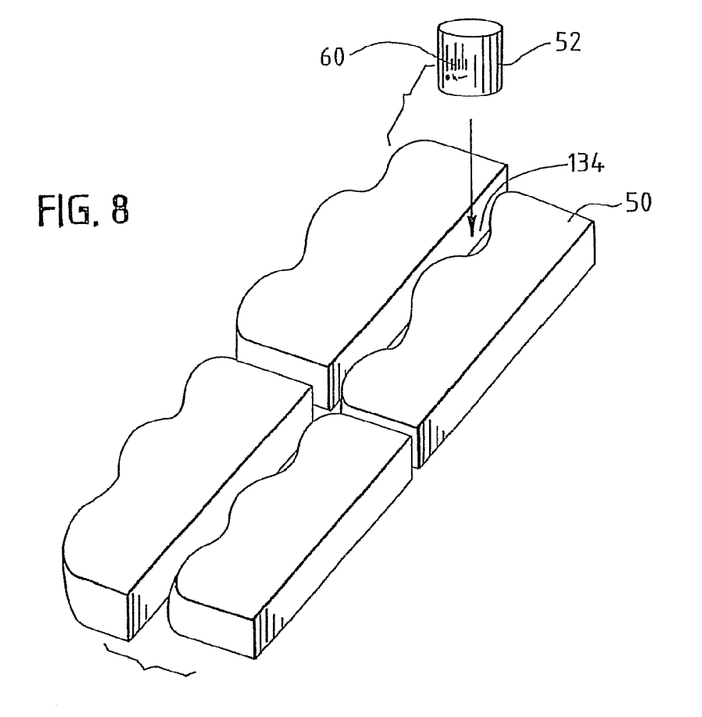

Referring now to FIG. 8, another known concrete block 50 is shown in the form of a "scalloped" lawn edging block. In this specific embodiment, the label 52 may be in the form of a tube. In this embodiment, because each concrete block 50 does not contain a recess, the label 52 in the form of a tube may be inserted between concrete blocks in the area defined by the scalloped edge 134 of the block 50. Of course, at least two adjacent blocks 50 are required to retain the label 52 in this configuration. Preferably, the printed data on the label faces inwardly to avoid abrasion.

Figure 9:
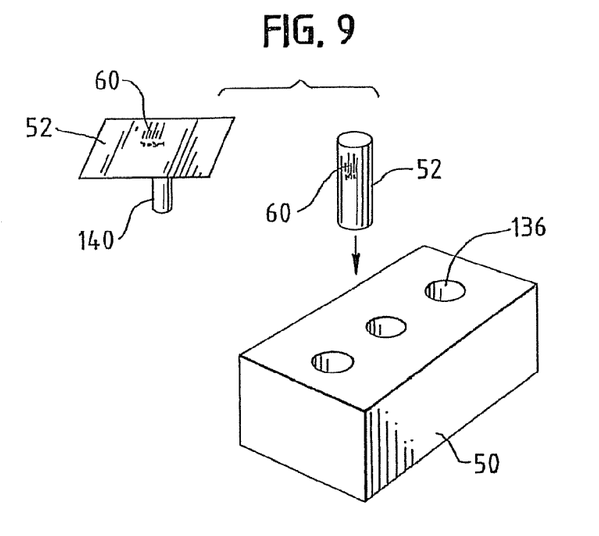

Referring now to FIG. 9, another known block 50 is shown in the form of a standard brick. As is known, the brick need not be formed of concrete material, but is nonetheless a masonry block. The brick 50 may have a plurality of tubular apertures 136. In this specific embodiment, the label 52 may be in the form of a tube or "rolled-up" sheet, which may or may not be sealed about a longitudinal seam. When the label 52 is inserted into the aperture 136, the label is retained within the aperture of the brick 50, also with inwardly facing printing. The label may also have a "leg" 140 affixed thereto, which may be received within the aperture 136 of the brick 50 for releasable securement.

Figure 10:
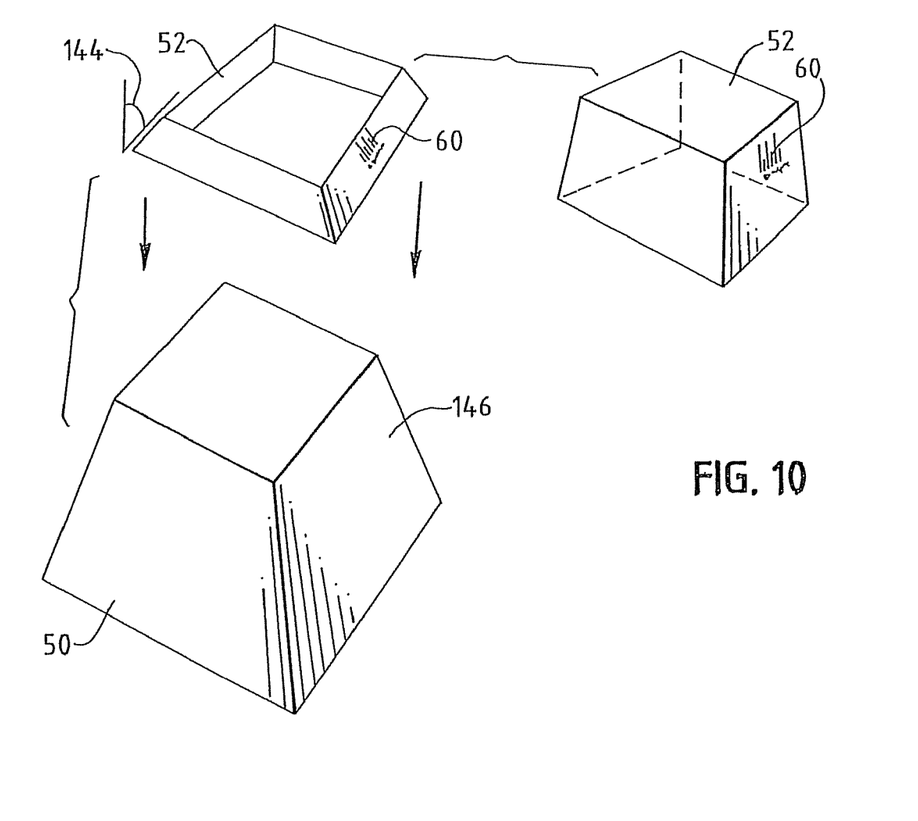

Referring now to FIG. 10, another known concrete block 50 is shown in the form of a standard flat top pier block. In this specific embodiment, the label 52 may be in the form of a belt or continuous shape that may be placed over the top of the concrete pier block. The belt 52 essentially circumscribes a perimeter portion of the concrete block 50. The angles 144 of the belt preferably match the angles of the slope of the pier block 50 so that the sides of the belt are parallel to the sidewalls 146 of the block when snug. Because the concrete block 50 is trapezoidal in shape having a larger bottom than top, the label 52 in the form of the belt may be retained midway along the block. Alternatively, the label may be in the form of a "hat" having five sides. The hat may be placed over the top of the pyramidal shaped block 50 for a snug releasable fit. The tapered shape of the block itself prevents abrasion of the label.

The releasability of applied labels to concrete blocks presents a range of practical problems to be overcome. The concrete block manufacturing process is typically fully automated from the initial mixing of concrete ingredients to the final stacking of finished blocks on the pallet. After discharge from the curing kiln, the process moves at a rapid pace with mechanical conveyors, platen rollers and moving transfer tables facilitating the manufacturing process. During the manufacturing process, releasable labels may be jarred or vibrated loose or otherwise dislodged from the blocks. Accordingly, a small amount of adhesive or a removable mechanical means, such as a barb or staple, may be applied so that the labels are not accidentally separated from the blocks during manufacturing or stacking on pallets.

The adhesive or small staple or barb may also be used during the transport of the blocks on open flatbed trucks, or at the retail site when the pallets of blocks are directly exposed to the elements, such as wind. Labels that are accidentally dislodged from the blocks during manufacturing, transport, or before the actual sale, are not intended by the present invention. Of course, different configuration of blocks may or may not require adhesive or mechanical means to secure the label depending on the specific qualities of the individual block. However, in all cases, the label may be easily removable from the block for retail sale, and may be removed without the use of scrapers, pliers, cutters or specialized detachers.

Figure 11:
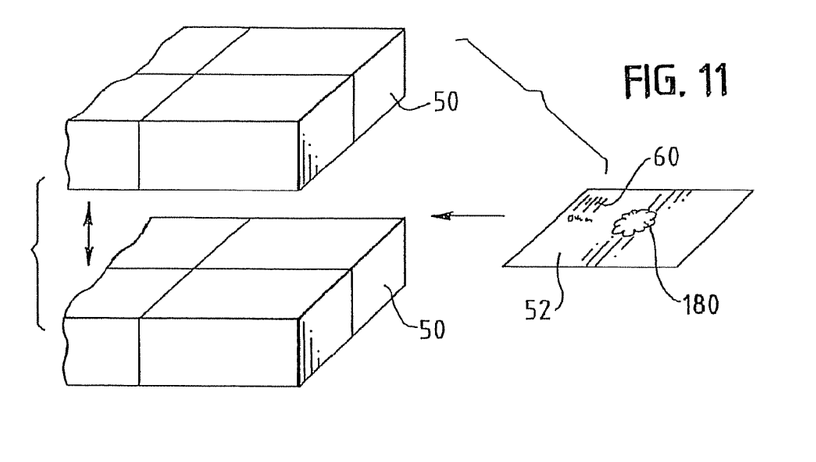
FIGS. 11-20 are pictorial views of alternate embodiments of a label for a layer of concrete blocks on pallets.

Referring now to FIG. 11, as described above, each label 52 may correspond to a single block, but is not necessarily limited thereto. The label 52 shown in this embodiment may be placed between layers of concrete blocks as they are stacked on a pallet. One label 52 may be used, or a plurality of labels may be placed between layers of the concrete blocks. During the typical palletizing process, labels applied through such means may be inadvertently dislodged from between the layers. A small amount of adhesive 180 may be placed on the label 52 to form a "compressible" or pliant means for securing the label or labels as the blocks are combined into palletized form. Of course, releasable labels with pre-applied adhesive, or "sticky-back" labels may also be used.

Figure 12:
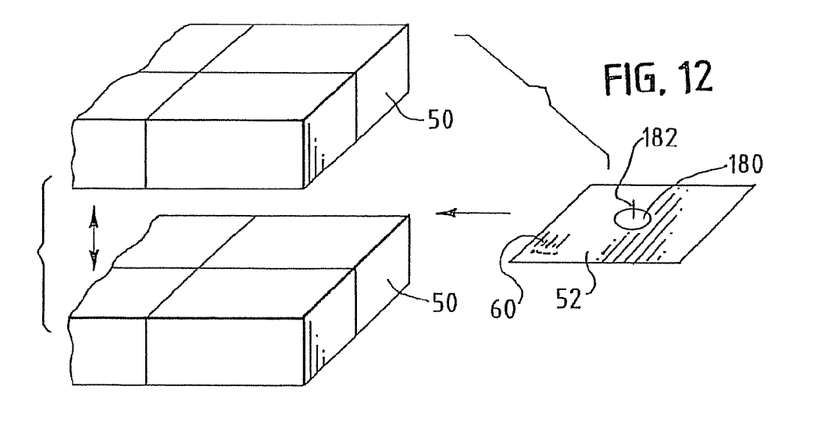
Figure 13:
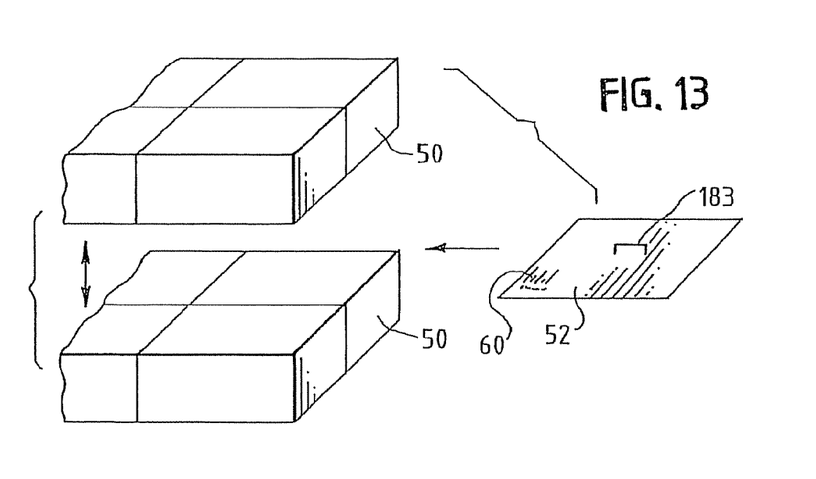

Referring now to FIGS. 12-13, in lieu of adhesive 180 described with respect to FIG. 11, a small barb 182 or staple may be included. As described above, the manufacturing process may inadvertently dislodge one or more labels as they are placed between layers on a pallet. The labels may also become shredded, abraded or torn during application of the labels during palletizing. Accordingly, a small amount of adhesive 180 or a staple 183 may prevent accidental dislodgement or destruction of the labels.

Figure 14:
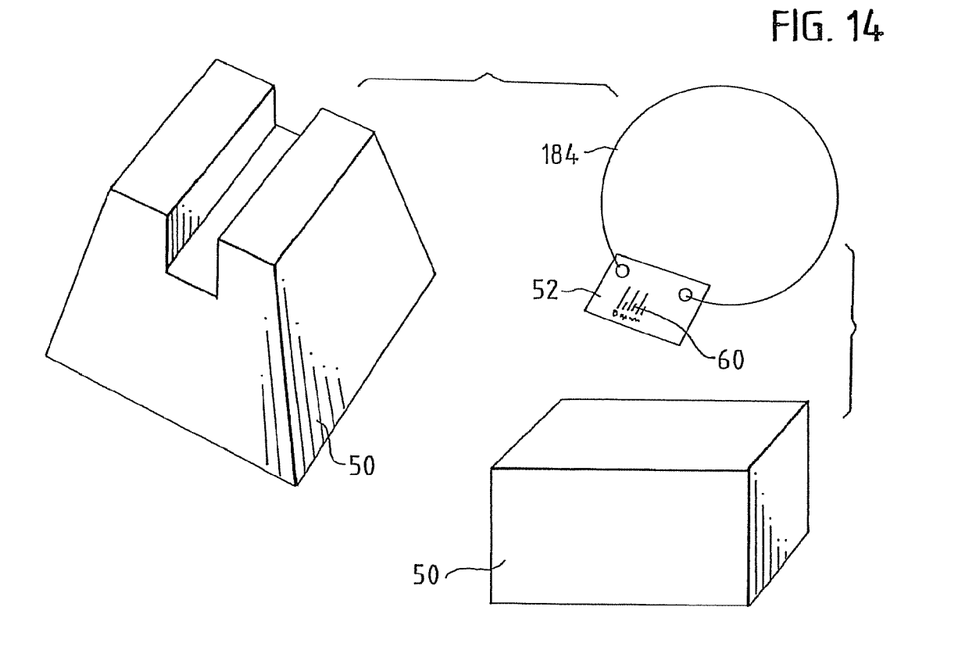

Referring now to FIG. 14, alternatively, a length of filament 184 may secure the releasable label 52 to any of the variously configured concrete blocks 50. At the time of the retail sale, it is not necessary to cut or separate the filament as it may be "undraped" from around the body of the block.

Figure 15:
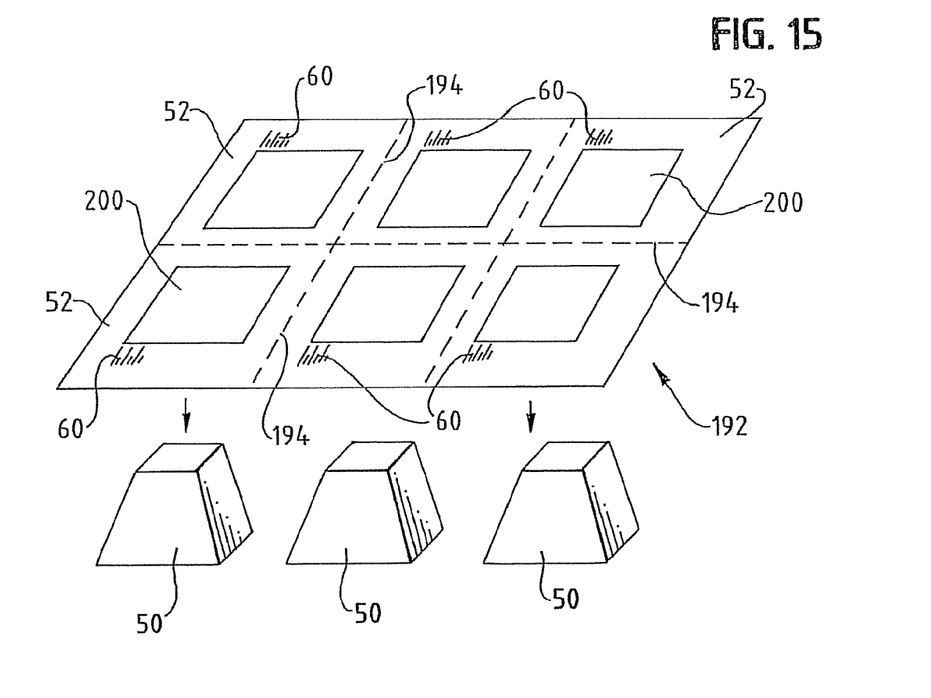

Referring now to FIG. 15, and as described above, the concrete blocks 50 may be disposed on a pallet in layers. For example, for relatively large blocks, the pallet may contain two blocks in width and three blocks in length for a total of nine blocks in one layer of the pallet. Thus, one layer may represent a three-by-two matrix. Accordingly, the label 52 may be in the form of a sheet 192 of releasable labels having perforation lines 194 between adjacent labels. In this specific embodiment, each individual label 52 of the sheet 192 of releasable labels may include a central cut-out portion 200 configured to receive a upper portion of the concrete block 50. When the sheet of labels 192 is applied to a layer of concrete blocks 50, an upper portion of each block in the layer may be received through the cut-out openings 200 of each label 52 until the sides of the block prevent the sheet from settling downward, thus securing the label sheet to the pallet layer and preventing abrasion of the labels. When one or more blocks 50 are purchased, the corresponding label 52 may be separated from the sheet 192 of labels along the perforations 194.

Figure 16:
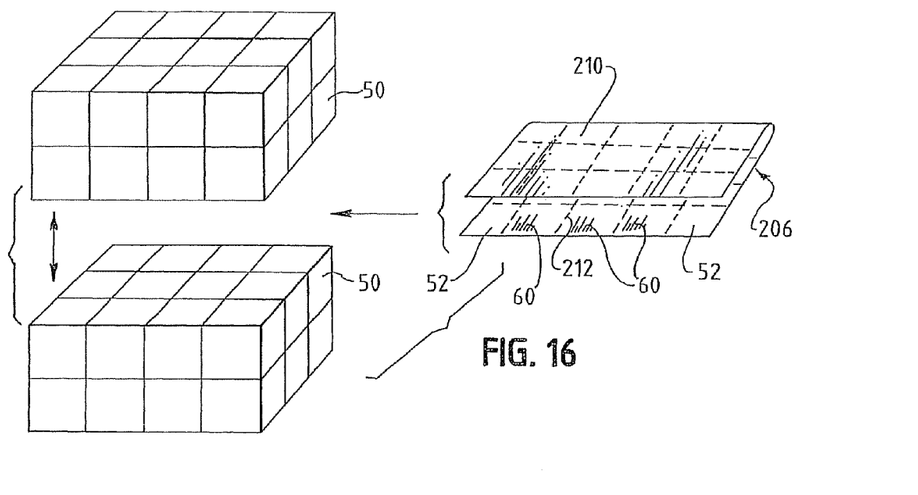

Referring now to FIG. 16, several layers of concrete blocks 50 are shown. In this specific embodiment, the releasable labels 52 may be in tie form of a continuous sheet 210 having perforation lines 212 between adjacent individual labels. The sheet 210 may be disposed between the layers of the blocks, and the weight of the blocks and/or an adhesive may permit the sheet of labels 210 to remain in place. When one or more blocks 50 are purchased, the corresponding label may be releasably detached from the sheet 210 of labels along the perforations. The label sheet 210 may be twice die area of the corresponding area of the layer of blocks, for example, and may be folded-over on itself within the same layer of blocks 50. In this case, the back side of the labels 52 may directly contact the surfaces of the blocks. The front side of the label having the printed UPC barcode indicia thereon would be protected from abrasion within this configuration.

Figure 17:
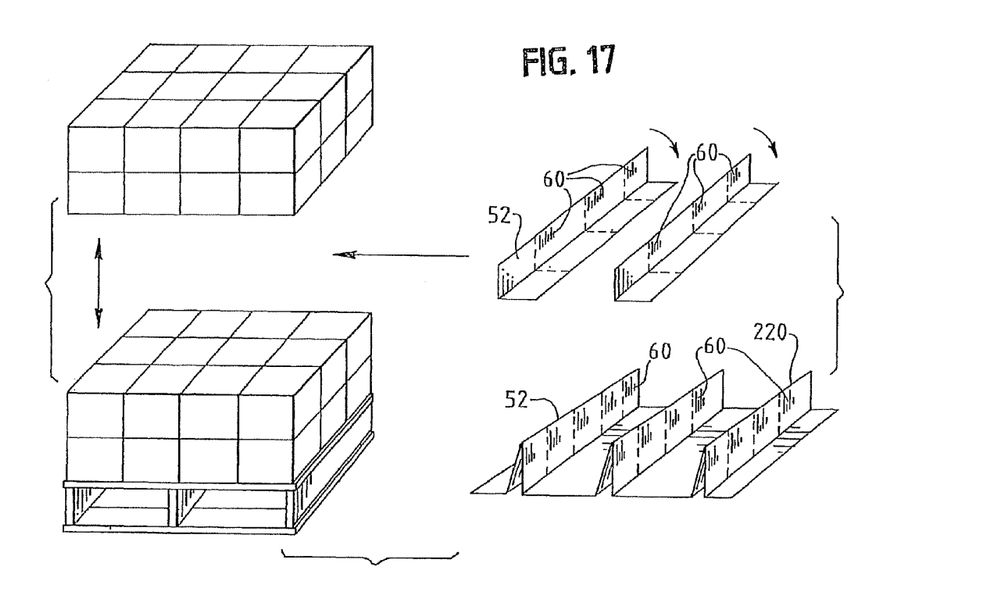

Referring now to FIG. 17, the labels 52 may be folded-over in individual strips of releasable labels. Such folding may protect the printed indicia on the internal faces of the strips when applied to the layer of blocks in the pallet. The perforated strips of releasable labels may also be in the form of a vertical "fin" 220, which may be bent at an acute angle to form a compression securement means between horizontal layers of blocks on a pallet. The vertical "fins" 220 nesting between the vertical sides of adjacent blocks in the pallet thus provide another type of securement means for labels for concrete blocks in pallets.

Figure 18:
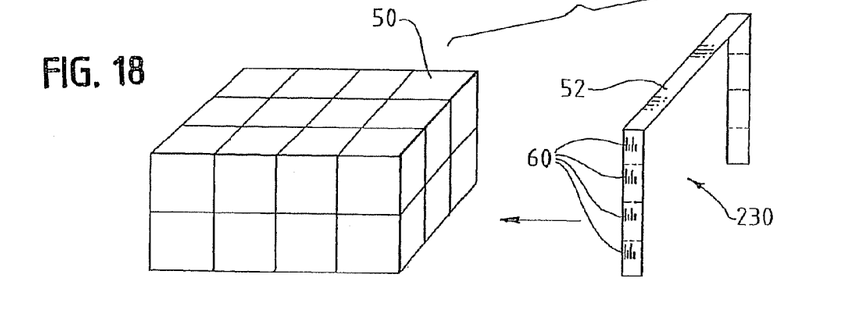
Figure 19:
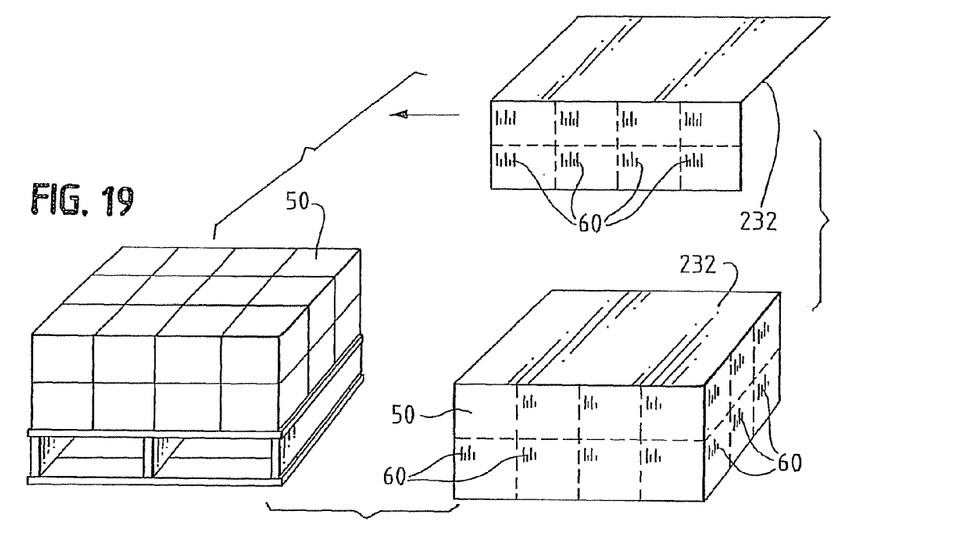

Referring now to FIG. 18, in this specific embodiment, the labels 52 may be in the form of a perforated "drapery" 230 that may be applied between layers of blocks on the pallet. Similarly, FIG. 19 shows a continuous sheet of perforated releasable labels that may also be "draped" between the layers of blocks on the pallet. In these cases, additional securement means, such as, for example, adhesive or a staple may not be needed because the "drapery" effect may tend to engage the external sides of the block pallet during the stacking process onto the pallet. During transport to and while at the retail site location, the weight of the blocks may provide sufficient securement of the releasable labels 52.

Figure 20:
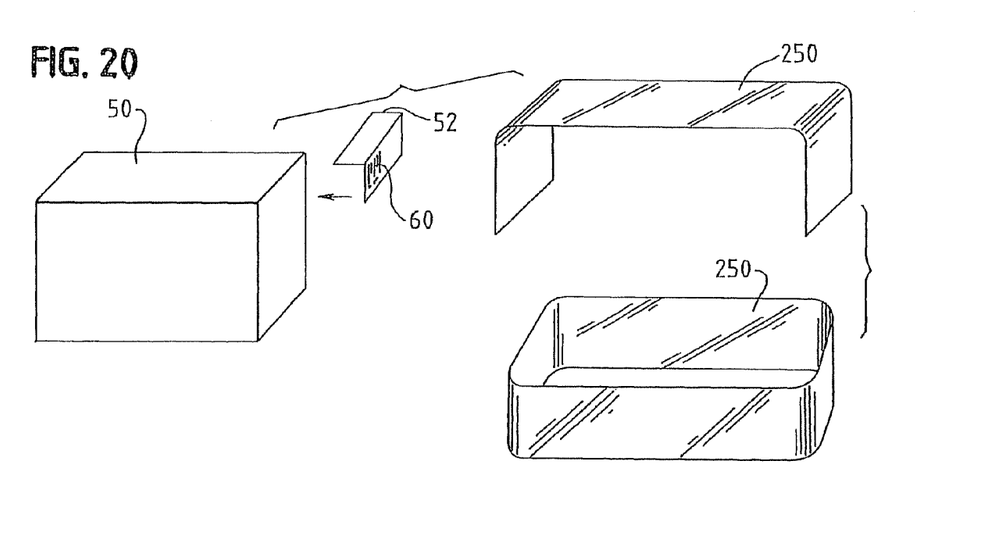

Referring now to FIG. 20, a releasable label may be secured to die block 50 through a wrapping or clear film or plastic 250. A label 52 may be applied to the block 50 where the label is located below the plastic film, adhesively applied to the plastic film or, alternatively, printed on the plastic film itself to further protect the label from abrasion. The entire label 52, or a portion of the label may be releasable from the block 50 by sliding die label outward from below the plastic film 250, by peeling the label from the plastic film or, alternatively, by removing the plastic film from die concrete block.

As described herein, a product label on manufactured concrete blocks is important from the point of view of retail store inventory management and POS transactions through the use of the UPC barcode. However, a product label has significant additional importance relative to the associated indicia or printed information that may be included on the label, and which may be directed to the end-using consumer.

Most products sold by retail building material establishments provide basic instructional information on the packaging or labeling of the product itself. However, as described herein, concrete blocks are an anomaly and are not packaged, wrapped or labeled, and thus do not include any consumer instruction for use of the product. The lack of basic instructional information for the DIY consumer is a significant problem in the retail sales industry.

Various efforts by both retailers and vendors of concrete block products have been made to overcome this problem. In some cases, the vendors of concrete blocks provide DIY instructional information through store displays, printed plans, books, pamphlets, and related literature. However, such literature is usually located separate and apart from the concrete blocks. Typically, the literature is located in one section of the store, or by the cashiers, while the blocks are typically located in another section or a peripheral area, as described above. This is confusing to the consumer and frequently results in the DIY consumer not receiving the necessary instructional literature.

Building material retailers may also include instructional information within their paid advertising, such as newspaper inserts and printed circulars. This known method, however, also separates the instructional information from the product. Neither of the above-described methods is uniformly effective, and may implicate important marketing and customer satisfaction considerations.

These marginally effective methods, in lieu of a product label, do not adequately insure that potential sales will be made. At the most basic level, an unlabeled generic product cannot be identified or verbally requested by the consumer, which can lead to the purchase of an incorrect product. Further, DIY consumers typically have little experience in construction projects using concrete blocks, and may require a certain amount of instructional information to successfully complete a project. Lack of confidence in a customer contemplating a purchase can often lead to a sale not being made.

A product label can provide assembly instructions, a list of necessary tools, construction "tips" and pictorial illustrations to assure and educate the consumer. In broader terms, a label can describe warranty data, limitations, and restrictions as required by the manufacturer to insure appropriate use. Inappropriate use of a product by a consumer can lead to returns of product to the store, customers dissatisfaction, and reluctance by the consumer to continue purchasing from a specific retailer. To the direct benefit of a retailer, a label can provide sales advantages by including information, such as technical assistance phone numbers, specific mailing addresses, and information for accessing a computer website, all of which may reduce employee time and expense in serving the retail consumer. Providing a product label directly on concrete blocks is a substantial improvement that benefits both the DIY consumer and the retail establishment.

Referring back to FIG. 2B, the label 52 of FIG. 2A is also shown attached to a similarly shaped or "mirror-image" label 260, where each label portion is connected to the other portion at a fold line 262. In this embodiment, the label portions may be folded in half about the fold line 262, and the "double label" may be applied to the concrete block in a manner described above with reference to FIG. 2A. In this embodiment, the "second half" 260 of the label serves to essentially double the "real estate" area of the label so that additional indicia and printed matter described above may be further included. It is also noted that any of the labels shown in the attached drawing figures may be configured in accordance with FIG. 2B to provide additional printing areas on a "mirror-image" portion of a concrete block label. Of course, any suitable number of labels can be joined or subjoined in this manner.

Another advantage of the present invention is that many modern retail merchants are highly dependent on "self-selling" products where the packaging or label is the "expert" sales medium, which labels provide information to the consumer that may or may not be generally available from store personnel. Unlabeled generic products may be considered "suspect" by the average consumer because it lacks technical information and product description. The present invention changes the typical consumer's perception of generic concrete blocks as a retail product. With an applied label, unidentified "suspect" products now have a market identity with its associated goodwill. The product can be requested by name, and can be properly used and "branded" for consumer satisfaction. The intangible marketing benefits of such branded products may also result in greater marketplace acceptance and wider distribution within the retail industry.

Further, consumer confidence, product preference, and reputable brand identity may be dependent on the labeling of a product. Absent trade name identity or information regarding the source and use of a product, an unlabeled generic item is disadvantageous to both the retail merchant and individual consumer. The present invention overcomes the problems described herein with a single solution and makes concrete blocks contemporary to the modern retail marketplace.

Referring back to FIG. 1, the known computer system or retail inventory management system 10 and POS terminal 16, in conjunction with the labels 52 shown in FIGS. 2A-2I, permit the identification of concrete blocks and the management of the sale of such concrete blocks in the retail a establishment. Using the present invention and method, concrete block are no longer anomalous to the retailer, and may attain a high level of consumer acceptance.

In operation, and as described above, the concrete blocks are delivered to retail establishments and are offered for sale at the retail establishments on the shipping pallets on which they arrived. Typically, the blocks are stacked on layers on the pallet, and many such pallets are stored outside of the store, either in an area of the parking lot or in a fenced-off area adjacent the store. Accordingly, the labels of the present invention are releasably secured to one or more concrete blocks or to one or more layers of concrete blocks in the pallet. The labels have UPC barcode information affixed thereon, such as the UPC encoded symbol, and the like. Each label or portion thereof may be removable from one or more concrete blocks or one or more layers of concrete block in the pallet.

The customer then views the different blocks and makes a selection of the particular configuration or type of block, and the amount of such blocks to purchase. In some cases, the customer may transport the blocks through the store to the POS terminal wherein the releasable label is presented to the POS cashier, and the sale is quickly and efficiently electronically processed. In other cases, such as when the blocks are located in an external area peripheral to the store, the consumer may simply remove one or more of the releasable labels from the block or layer of blocks. The customer may then bring the releasable label to the POS terminal along with any other products he or she wishes to purchase. The POS cashier then scans the released label via the laser scanner 18 of the POS terminal 16, and enters the quantity of blocks to be purchased, without the blocks being physically present.

Once the cashier has scanned the label and entered the amount of blocks purchased, the POS terminal may send the electronic information to the computer system 10 so that inventory and sales records may be updated in "real time" to effect maintenance of the inventory of concrete blocks at the retail establishment. Once the customer has paid for the merchandise, the cashier may issue a receipt to the purchaser evidencing purchase of the concrete blocks. The customer may then provide the issued receipt to an employee of the retail establishment to authorize distribution and release of the purchased concrete blocks to the customer.

According to the present invention, purchases of concrete blocks that are physically carted to the POS terminal are now made compatible with the established electronic sales format of modern retailers by the presentation of a releasable label to the cashier. Such sales are quickly and efficiently processed in the standard POS sales method. Additionally, purchases of concrete blocks from external sales areas or areas peripheral to the store may now be made by the presentation of a releasable label to the cashier at the POS terminal without the blocks being physically present at the POS terminal. Positive accounting of the quantity of blocks purchased may also be enhanced for such sales by marking the desired quantity of blocks on a portion of the releasable label before it is presented to the cashier at the POS terminal. Finally, complete and accurate inventory information for the concrete blocks is maintained, thus eliminating the "human-factor" errors that may be introduced during the existing manual data entry phase of concrete blocks as they are currently sold.

The present invention presents a single non-obvious solution to different problems that occur between different industries. The same solution also directly benefits consumers of concrete blocks by creating a dependable brand identity from a generic product previously indistinguishable in the retail marketplace.

Specific embodiments of a system and method for labeling and managing the sale of concrete blocks according to the present invention have been described for the purpose of illustrating the manner in which the invention may be made and used. It should be understood that implementation of other variations in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method of identifying and selling concrete or masonry blocks and managing the sale thereof to a customer at a retail establishment, the method comprising:

providing a computing processor and computer memory, said computing processor and computer memory connected to a sales terminal;

providing unlabeled concrete or masonry blocks with irregular surfaces arranged in bulk layers;

preparing a plurality of identical labels on a sheet, each label of said identical labels having a product indicia thereon to associate the label with a product identity of said concrete or masonry blocks;

wherein said product indicia is electronically scannable to relate said product identity of said concrete or masonry block to said computing processor and said computer memory;

applying the sheet of said labels between the layers of concrete and masonry blocks during the arrangement of said concrete or masonry blocks in the layers so as to protect said sheet of labels and said product indicia; said sheet of labels directly contacting a surface of an individual concrete or masonry block; said irregular surfaces of said concrete or masonry blocks cooperating with said label to secure an individual label to the individual concrete or masonry block;

wherein said labels are removable from said sheet and said labels are removable from said concrete or masonry blocks;

placing said labeled concrete or masonry blocks for sale at said retail establishment;

allowing the customer at the retail establishment to remove one or more labels from said sheet of labels and to remove one or more concrete or masonry blocks from said layers;

presenting said removed labels and said removed blocks at the sales terminal for purchase, said product indicia on said label identifying said concrete or masonry blocks for said purchase;

initiating a sales transaction with said computing processor and said computer memory;

scanning said product indicia on said label to read the product indicia;

entering the quantity of said concrete or masonry blocks for said purchase into said sales terminal;

transmitting said scanned data and said quantity of blocks for said purchase to said computing processor and said computer memories to provide the cost of the purchase; and completing said sales transaction and issuing the customer a receipt for the purchase of the concrete or masonry blocks.

2. The method according to claim 1 wherein the plurality of labels includes printed indicia selected from the group consisting of a barcode, product code identifier, product identification.

3. The method according to claim 1 wherein the sheet of labels has perforations between adjacent individual labels.

4. The method according to claim 1 wherein the sheet of labels includes cut-out portions configured to an upper portion of the blocks when layered in a bulk quantity.

5. The method according to claim 3 wherein the plurality of labels are separated along the perforations to remove the labels when blocks are presented for purchase.

6. The method according to claim 1 wherein the sheet of labels further includes one or more folds configured to protect printed indicia on the label from abrasion by the blocks.

7. The method according to claim 1 wherein the sheet of labels is draped over the blocks.

8. The method according to claim 1 wherein the sheet of labels partially encompass the perimeter of the blocks.

9. The method according to claim 1 wherein the blocks include one or more recesses and one or more sheets of labels removably secured within the recesses.

10. The method according to claim 1 wherein the blocks include peripheral surfaces and one or more sheets of labels are removably secured to the peripheral surfaces.

11. The method according to claim 1 wherein the product indicia information may also be manually entered into the point of sale terminal.

\* \* \* \* \*